United States Patent [19]

Fujimori et al.

[11] Patent Number: 5,601,793
[45] Date of Patent: Feb. 11, 1997

[54] SMALL-CAPACITY MULTI-PURPOSE BATCH PLANT

[75] Inventors: Hiroaki Fujimori; Hiroyuki Miyoshi, both of Yokohama, Japan

[73] Assignee: JGC Corporation, Tokyo, Japan

[21] Appl. No.: 450,568

[22] Filed: May 25, 1995

Related U.S. Application Data

[63] Continuation of Ser. No. 203,493, Feb. 28, 1994, abandoned, which is a continuation of Ser. No. 854,911, Mar. 20, 1992, abandoned.

[30] Foreign Application Priority Data

Mar. 26, 1991 [JP] Japan ................................. 3-062064

[51] Int. Cl.⁶ ............................. F28D 21/00; B01L 7/00; B01J 19/00; F28F 5/00
[52] U.S. Cl. .......................... 422/202; 422/104; 422/130; 165/86
[58] Field of Search ........................ 422/99, 104, 129, 422/130, 187, 189, 198, 202; 165/47, 78, 86; 248/332

[56] References Cited

U.S. PATENT DOCUMENTS

| 3,035,819 | 5/1962 | Mescher et al. | 165/64 |
| 3,441,381 | 4/1969 | Keith et al. | 422/176 |
| 4,151,874 | 5/1979 | Kaburagi et al. | 165/86 |
| 4,517,063 | 5/1985 | Cirjak | 204/157.1 R |
| 4,538,427 | 9/1985 | Cavalli | 165/46 |
| 4,963,499 | 10/1990 | Stockton et al. | 422/109 X |

FOREIGN PATENT DOCUMENTS

| 2237156 | 2/1975 | France . |
| 61-283337 | 12/1986 | Japan . |
| 62-144745 | 6/1987 | Japan . |
| 63-42734 | 2/1988 | Japan . |
| 63-88029 | 4/1988 | Japan . |
| 2-198628 | 8/1990 | Japan . |
| 3-127624 | 5/1991 | Japan . |
| 3-146130 | 6/1991 | Japan . |
| 3-178755 | 8/1991 | Japan . |
| 5-49915 | 3/1993 | Japan . |

OTHER PUBLICATIONS

Translation of Japanese Kokai No. 3–178755, Aug. 2, 1991.
Translation of Japanese Kokai No. 3–146130, Jun. 21, 1991.
Patent Abstracts of Japan, JP3178755, Aug. 2, 1991.
Patent Abstracts of Japan, JP57002998, Jan. 8, 1982.

*Primary Examiner*—Robert J. Warden
*Assistant Examiner*—E. Leigh Dawson
*Attorney, Agent, or Firm*—Armstrong, Westerman, Hattori, McLeland, & Naughton

[57] ABSTRACT

A small-capacity multi-purpose batch plant comprises a multi-floor type structure and reaction vessels with jackets for heating and/or cooling. The jacket consists of two halves which are attachable to and detachable from the vessel by closing and opening. The vessels are transported to any position in the structure by stacker cranes and/or conveying trucks in horizontal directions in the same stages and in vertical directions between the different stages. Heating and cooling of the vessels can be done with any heating and cooling media. The usable temperature range is wide, and there is no risk of distortion and cracking at the welded parts of the vessels due to thermal stress. Processes in which transfer of the liquid, particularly, separation of two phases or dropping is involved can be carried out without using pipings and pumps, and thus, contamination is minimized.

4 Claims, 5 Drawing Sheets

SMALL-CAPACITY MULTI-PURPOSE BATCH PLANT

This application is a continuation of application Ser. No. 08/203,493 filed Feb. 28, 1994 abandoned, which is a continuation of application Ser. No. 07/854,911 filed Mar. 20, 1992, now abandoned.

BACKGROUND OF THE INVENTION

The present invention generally relates to a so-called multi-purpose batch plant. More particularly, the invention relates to a small-capacity multi-purpose batch plant to be used for producing the products, though in small amounts, of very high purity or without contamination.

For production of the products of high added values in relatively small amounts such as fine chemicals, an invented apparatus for carrying out this in one vessel under different conditions depending on the purpose of the production, includes various plants for batch processes, and some of them have been used.

Typical examples of known batch plants are disclosed in "Vessel for Batch Production" of Japanese Patent Disclosure No.62-144745 and "Movable Tank Apparatus" of Japanese Patent Disclosure No.02-198628. These apparatuses employ not the system of transferring the materials to be treated, but the system of transporting the vessels from a station to station so as to carry out sequential operations.

In some manufacturing processes, for example, those for producing fine chemicals, there are many processes which involve chemical reactions, particularly, repeated complicated reactions. Further, the reaction temperatures extend over such a wide range as from minus ten to three hundred and some ten degrees centigrades, and strict control of the temperature is required. In numerous cases, the same vessels are subjected to repeated heating and cooling. The problems common in these situations are as follows:

| | Heat Source | Coldness Source | Problems |
|---|---|---|---|
| 1 | Steam | Thermal Media + Water | Heating to 300° C. or higher requires steam of 100 kg/cm² or higher. Usual jaket cannot stand with this pressure. Mixing of thermal media into water is inevitable. |
| 2 | Thermal Media | Thermal Media | Thermal media may pollute the environment. |
| 3 | Electric Heating | Cooling Coil | Local heating tends to occur. Cooling coil, if used, may be disturbance to the electric heating. |

In case where the range of thermal difference is large, welded parts of jaketted vessels receive significant thermal stress. This stress could be absorbed by an expansion bellow, but the effect is limited. If a crack occurs between the vessel body and the jaket, then the thermal media will be contaminated inside the vessel.

Even if the vessel can stand with this kind of problems, in the system of transporting the vessels, it is necessary to attach and detach the pipings for the utilities to and from the vessels at every cycle of heating and cooling. In addition to this, the blowing out of the liquid in the vessel must be done; and thus, a significant amount of labor is required.

The above discussed system of transporting vessels is based on the avoidance of contamination by carrying out no transfer of the content between the vessels. This benefit is not, however, available in some cases. Namely, in case where two liquid phases are formed after the reaction, the lower phase is separated and only the separated liquid is used in the subsequent reaction, it is then to transfer the separated liquid to another vessel. Thus, if the transfer is done through pipings, the possibility of contamination in the pipings is high. Also, in the case where the liquid obtained by an operation such as reaction or dissolution in one vessel is used as a dropping liquid to the other vessel, as far as the vessels being placed in the same level, gravity cannot be used as the driving force for transferring and it is necessary to use a pump and pipes. If the vessels are in the different stages, dropping the liquid in the direction from an upper stage to a lower stage is possible, but impossible in the reverse direction.

BRIEF SUMMARY OF THE INVENTION

The object of the present invention is to provide, as one of the solutions for the problems which the technology of multi-purpose batch plant is confronting with, an improved plant, particularly, those of small capacities. This invention facilitates both heating and cooling; fundamentally solves the trouble caused by the heat stress on the jackets; and minimizes contamination by using no piping even in case of a transfer of the content of the vessels.

In the batch plant for carrying out the processes in which chemical reactions are controlled and/or physical changes are caused by heating or cooling, the small capacity multi-purpose batch plant of the present invention comprises multi-floor type stages and transportable vessels, and is operated under the system of transferring materials, intermediates as reaction products, and final products, from a vessel to another vessel by gravity.

DETAILED DESCRIPTION OF THE PREFERRED EMBODIMENTS

Figure 1:
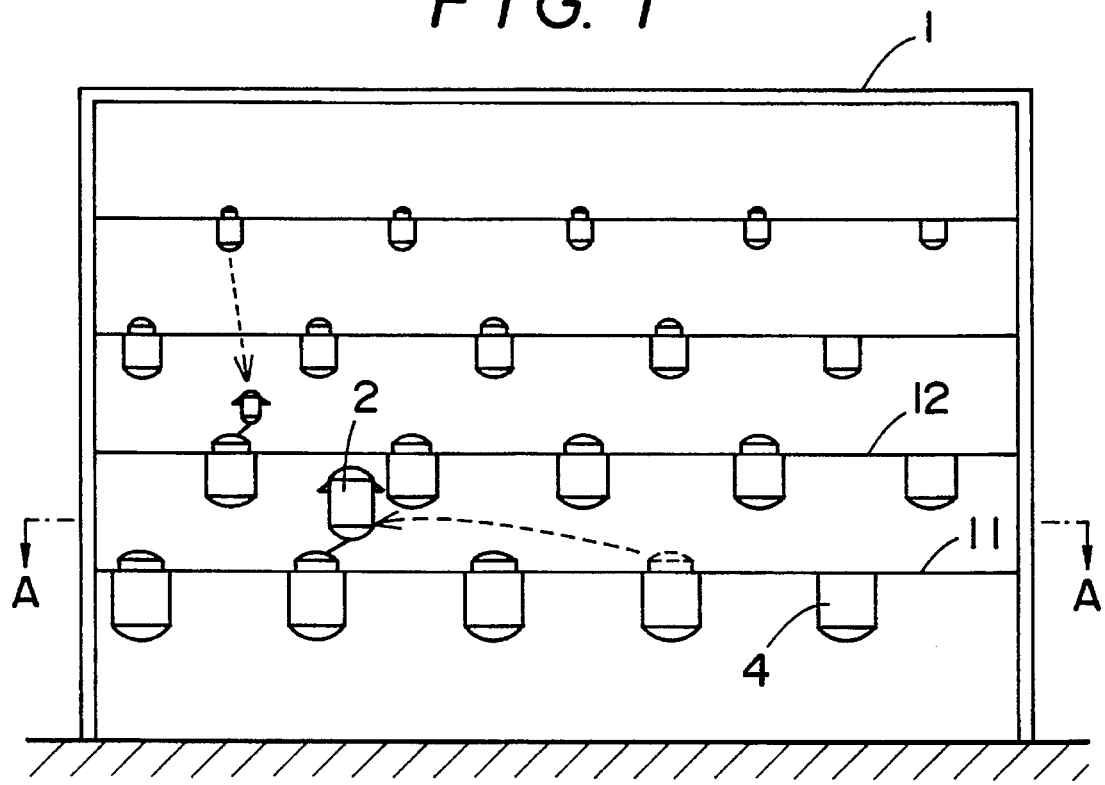
FIG. 1 is a schematic in a side elevational view showing the whole structure of the small-capacity multi-purpose batch plant according to the present invention.
Figure 2:
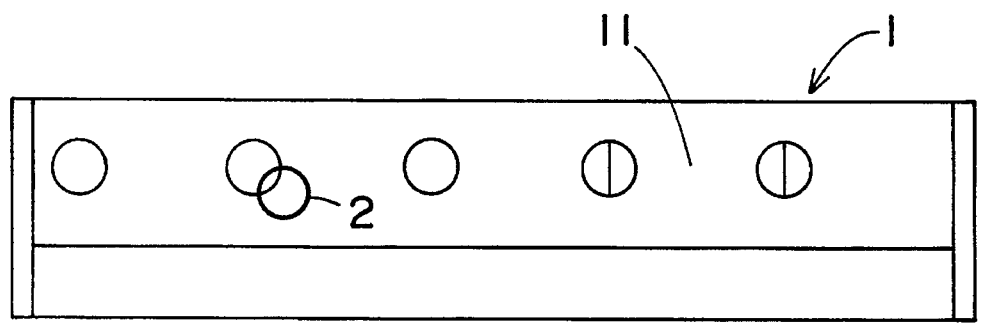
FIG. 2 is a cross-sectional view taken along A—A in FIG. 1.
Figure 3:
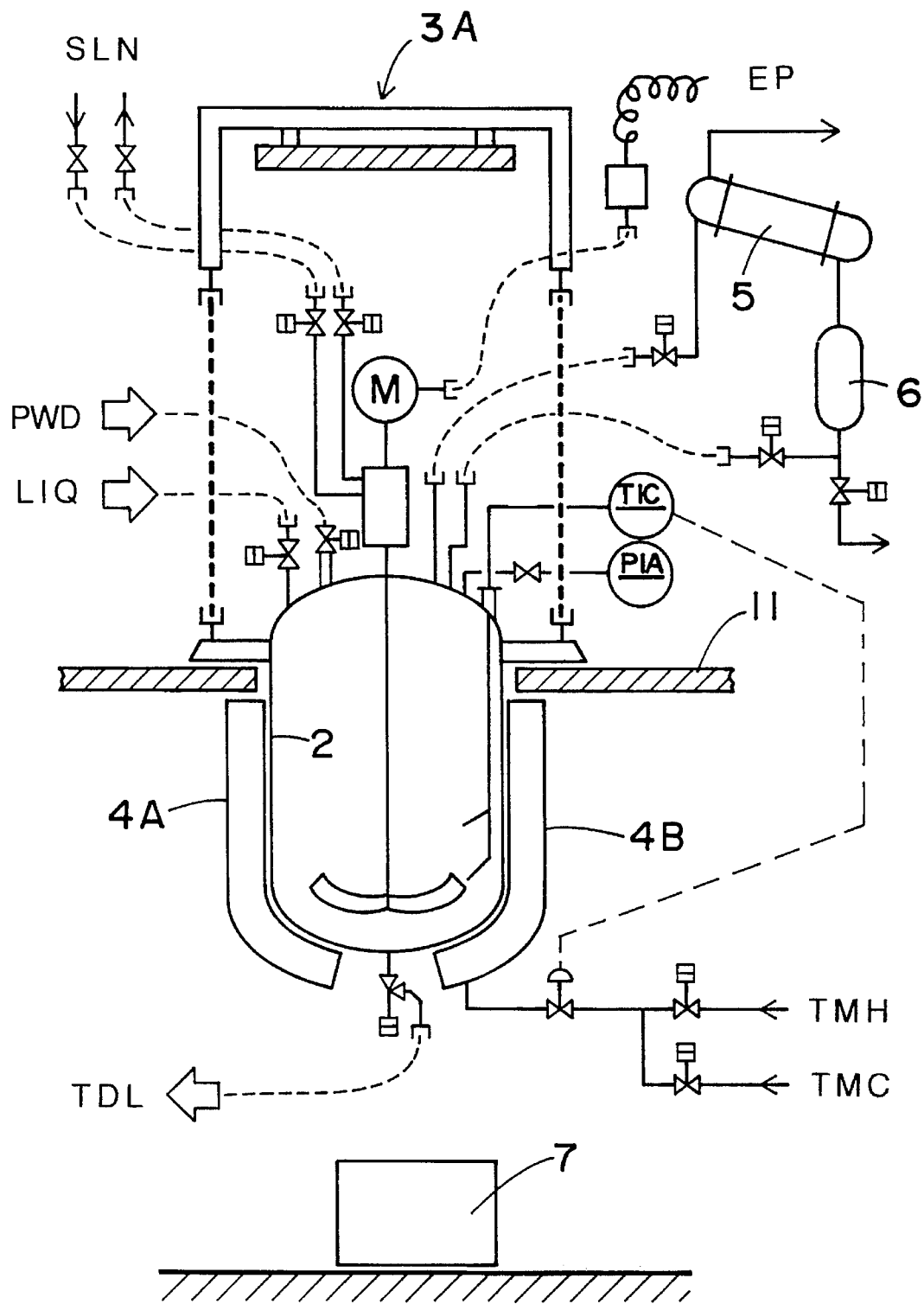
FIG. 3 is a vertical cross-sectional view showing the combination of a vessel and a jacket with some related components of the present batch plant.

The whole structure of the small capacity multi-purpose batch plant of the present invention is shown in FIG. 1 and FIG. 2. The detailed structures of the batch plant are shown in the other Figures. As seen from the drawings, the present plant is characterized in that it comprises a structure 1 having plural stages 11, 12, . . . ; plural vessels 2 having jackets 4 as means for heating and cooling; and means for transporting the vessels in horizontal directions in the same stages and in vertical directions between the different stages; and that the jackets 4 are separate bodies from the vessels, separable themselves into two or more parts, and attachable to and detachable from the vessels by closing and opening Details of the relationship between the vessel and the jacket are shown in FIG. 3. The Figure illustrates the vessel 2 transported by a stacker crane 3A or a conveying truck (not shown) and placed on a stage 11 as well as the jacket consisting of two parts, 4A and 4B, which are in the closed position and in close contact with the vessel. In FIG. 3, numeral references 5 and 6 refer to a condenser and a receiver, respectively, installed in the plant, and reference number 7 refers to shuttle vessel for conveying the materials or the products. The abbreviations in FIG. 3 have the following meanings.

EP: electric power supply, SLN: sealant gas;

PWD: powdery materials, LIQ: liquid materials,

TDL: treated liquid;

TMH: heating media, TMC: cooling media.

As illustrated in FIG. 3, in the case of an endothermic dissolution of the PWD in LIQ charged in vessel 2 under stirring, temperature decrease in vessel 2 makes the TIC actuate the valve in the TMH line to open, and by the flow control with the valve connected to jacket 4B further temperature decrease can thus be prevented. On the other hand, as further shown in FIG. 3, in the case of an exothermic chemical reaction of the PWD with the LIQ in vessel 2 under stirring, temperature increase makes the TIC actuate the valve in the TMC line to open, and by the flow control with the valve connected to jacket 4B further temperature can be prevented.

As shown in FIG. 3, as is well known in the art (see, Japanese Patent Publication No. 63-88029), the TIC (Temperature Indicating Controller) is directly connected to a valve near the jacket 4B, and connected to a combined line joined to the valves for the TMH and TMC.

Figure 4:
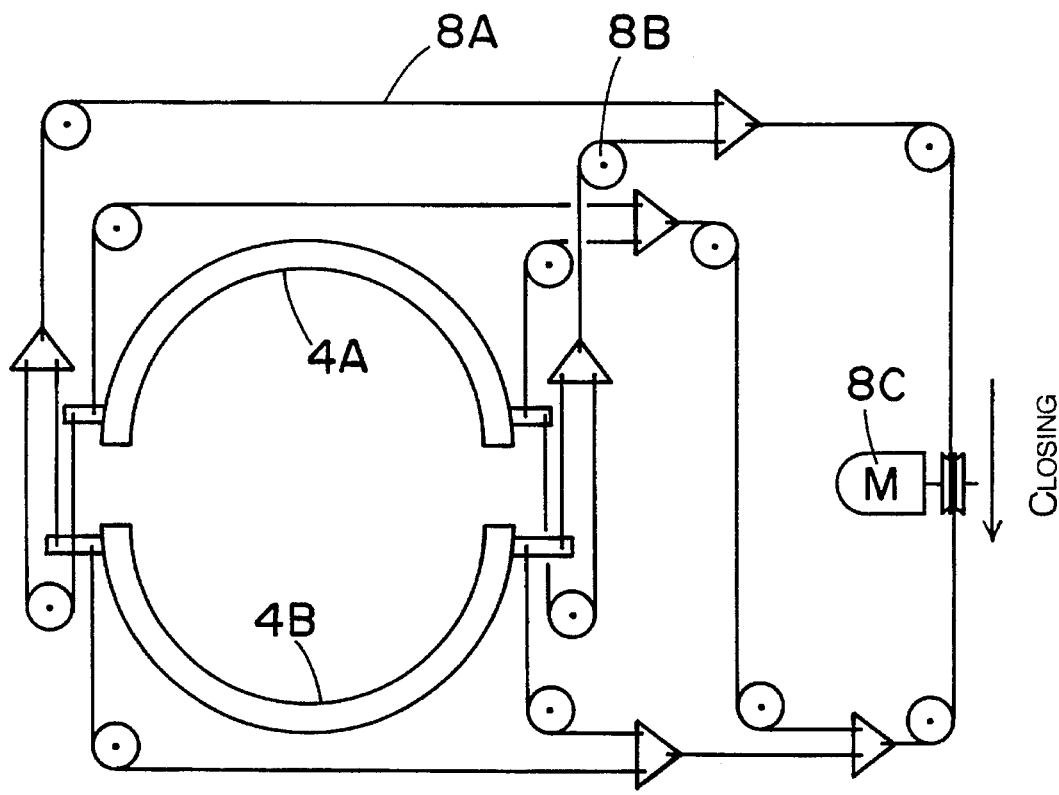
FIG. 4 is a schematic plan view showing an embodiment of a closing-opening mechanism of the jacket.

As one of the mechanisms for closing and opening the jacket, there is exemplified a combination of wire 8A and pulley 8B which are driven by a motor 8C as shown in FIG. 4. Of course, it is possible to use any other mechanisms for closing and opening, such as a hydraulic cylinder.

Figure 5:
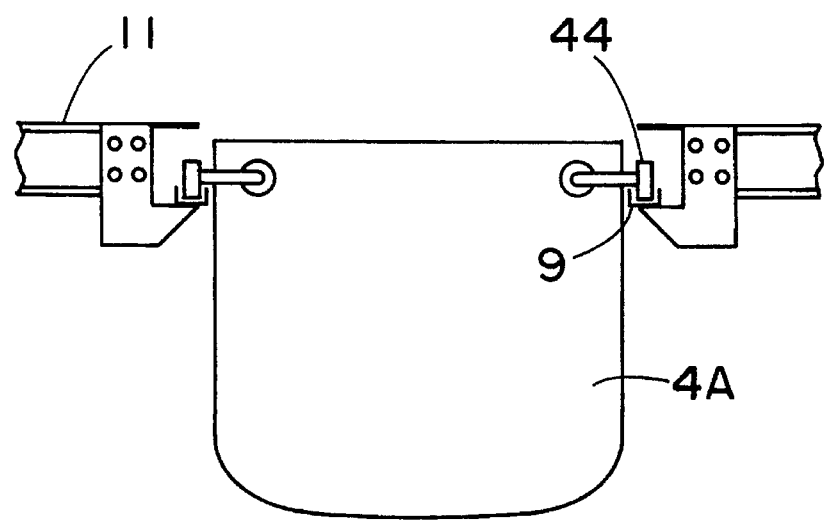
FIG. 5 is a plan view showing rails and rollers used for closing and opening the jacket.
Figure 6:
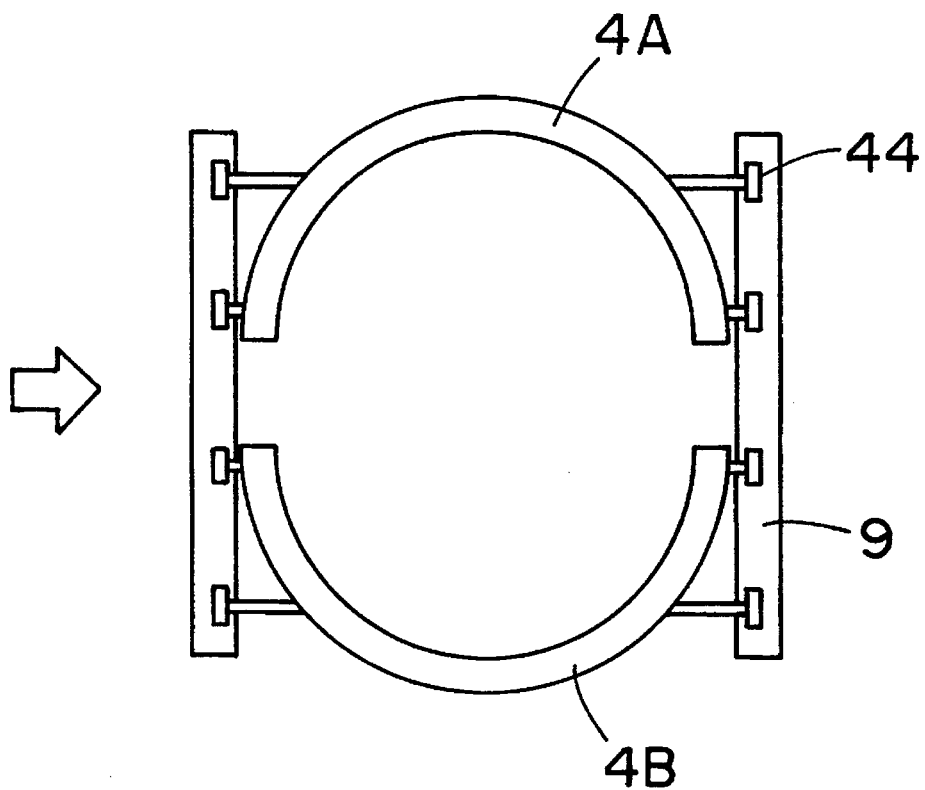
FIG. 6 is a side elevational view of the same object as that of FIG. 5.
Figure 7:
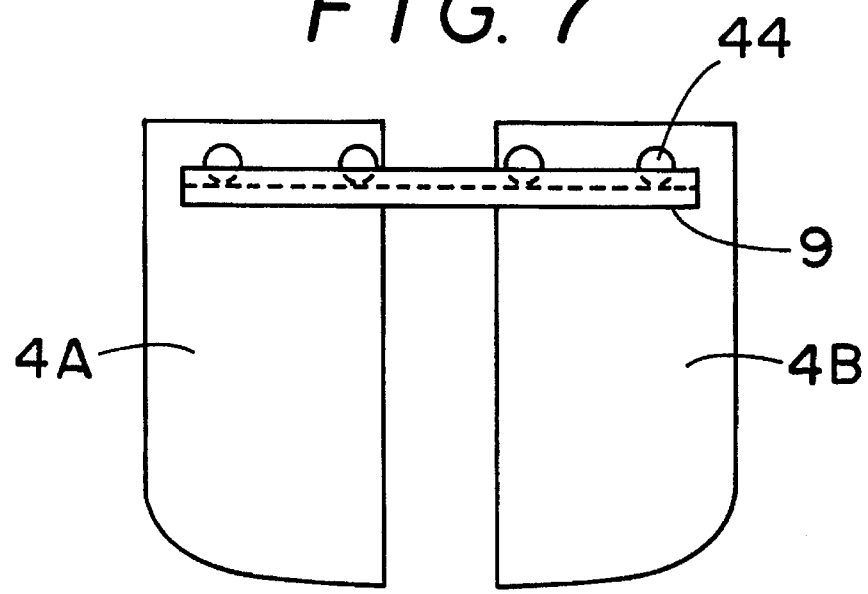
FIG. 7 is an arrow view of FIG. 6.

The two halves of the jacket can move, as shown in FIG. 5 and FIG. 6, with the roller 44 on the rail 9 to approach to and leave from each other. The rail 9 is layed preferably at a location a little lower than the stage floor 11 of the plant as shown in FIG. 5.

Figure 8:
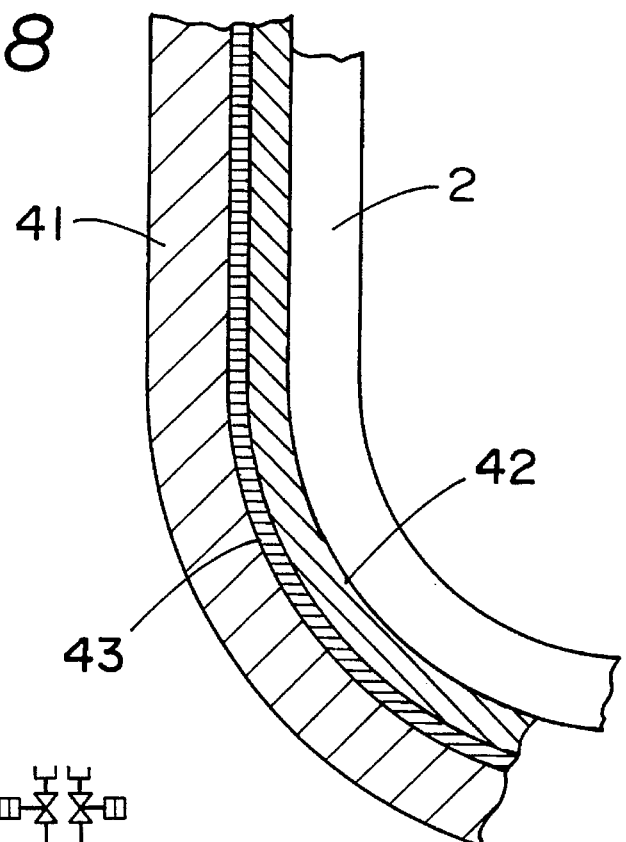
FIG. 8 is an enlarged cross-sectional showing view the lining inside the jacket.

It is recommended to line the inner surface of the jacket 41 which contacts the outer surface of the vessel as shown in FIG. 8, with a heat-conductive material having some cushioning property such as a metal mesh 42 or a metal fabric by using a heat-resistant and heat-conductive adhesive 43 (such as "Thermocement" available in the market). Then, when the two halves of the jacket are closed to grasp the vessel, the jacket may not press the vessel in tight, but there may be no gap between the surfaces, and thus, efficient heat transfer occurs.

Figure 9:
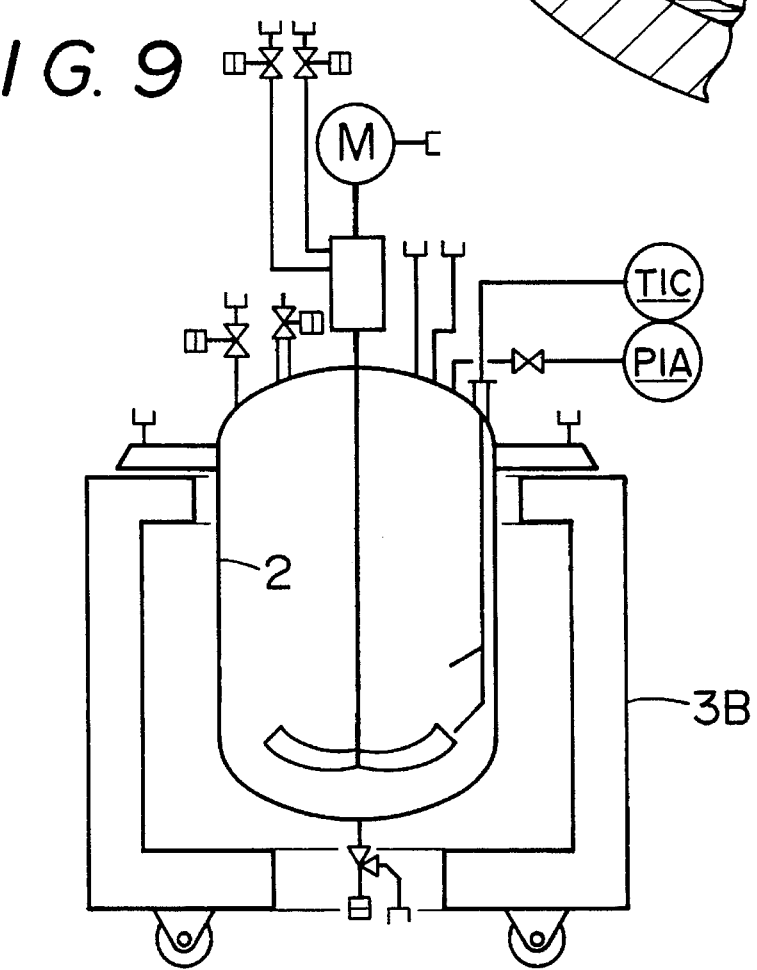
FIG. 9 is a vertical cross-sectional view showing the transportation of the vessel with a conveying truck in the batch plant of the present invention.

Transportation of the vessel 2 in the same stage may be done with the use of a conveying truck 3B as shown in FIG. 9. In order to attach the jacket 4 to the vessel 2, it is necessary to provide a means for inserting the vessel in the jacket.

Operation of this batch plant is carried out as follows:
1) Metering and Charging Materials
(Initial Materials)

The vessel is transferred with a stacker crane to the material-metering section (not shown), and the necessary materials are charged into the vessel there. The vessel containing the materials is transferred by the stacker crane again on the determined jacket for heating or cooling and placed on the stage, then the jacket is closed to contact the vessel.

In an alternative manner, a shuttle vessel is transferred to the metering section with the stacker crane for charging the materials, and returned with the stacker crane again, and thus, by way of the shuttle vessel, the materials may be charged in the vessel which is placed on the determined location.

(Additional Materials)

In the case where additional materials are charged after the initial materials are treated or where additives or auxiliaries are charged during the treatment, it is advisable to use the above mentioned shuttle vessels. FIG. 3 shows that powdery or liquid substances can be supplied. Even if a drastic change in the reaction conditions, such as switching from heating to cooling, is done after the charging of the additives or the auxiliaries, the change may be made by simply changing the flowing routes of the thermal media.

2) Reaction

A heating media or a cooling media is introduced in the jacket and stirring is done in the vessel to promote the reaction.

3) Transfer of the Liquid

In case where the content in a vessel is transferred to the other vessel for separation of the liquid after the reaction or for carrying out a process in which dropping of the liquid is done, the vessel containing the substance is transported with the stacker crane to the side of the receiving vessel, and the vessels are connected so as to transfer the content. This is the same in the case where the liquid is transferred to the other step, such as centrifugal separation.

4) Washing

The reaction vessels and the shuttle vessels are transferred to the washing section (not shown) after use and cleaned by washing for further use.

The small-capacity multi-purpose batch plant according to the present invention has the following merits owing to the separate structure of the vessel for treatment and the jacket for heating and/or cooling the vessel:

A) It is not necessary to attach and detach pipings for the utilities at the time of heating and cooling;

B) It is possible to choose suitable heating and cooling media, and it is possible to avoid polution of the working environment;

C) The problem concerning the heat stress at the welded part of the vessel is basically solved, and there is no risk of mixing in of the heating or cooling media into the process flow; and D) Due to the advantages set forth in items B and C, above, the operable temperature range of heating and cooling is broad.

The structure of multi-floor stages and distribution of the vessels thereon enables the transfer of the vessels to any desired position with stacker cranes, and thus, it is possible to choose the patterns of use and transfer of the vessels, and increase the rate of operation of the vessels. Also, use of conveying trucks in the stages makes it possible to efficiently use the space in the plant. Even in the processes which include liquid separation or dropping using plural reaction vessels, no piping is necessary for connecting the vessels; and therefore, contamination may be minimized.

Even in case where a production increase is demanded in the use of the batch plant of this invention, unless the capacity of heating and cooling controls the rate of production, simple addition of vessels may enable increase in the capacity. This is of course economically advantageous. In general, requirement of increase in the capacity of heating/cooling concerns not both of them but only one of them, and could be achieved by installing additional jackets. Installation of the jackets may be done at vacant spaces of any stage of the structure, and this is relatively easy.

The small-capacity multi-purpose batch plant of this invention is the most suitble for the production of fine chemicals of high added velues, which are produced in a small scale (based on the volume of the vessel, some tens to two thousand liters) without contamination. The batch plant is useful in a wide variety of fields, (e.g., medicines, agricultural chemicals, surfactants, plasticizers, additives, engineering plastics, pigments, perfumes, cosmetics, and foods).

While the invention has been particularly shown and described in reference to preferred embodiments thereof, it will be understood by those skilled in the art that changes in form and details may be made therein without departing from the spirit and scope of the invention.

We claim:

1. A small capacity multi-purpose batch plant for carrying out processes in which chemical reactions are controlled and/or physical changes are caused by heating or cooling, said small capacity multi-purpose batch plant, comprising:

a plurality of floor stages;

a plurality of transportable vessels, each transportable vessel capable of being charged therein with materials, and being transported depending on at least a type of process said materials therein must undergo by heating or cooling of said transportable vessel;

jacket means for receiving therein at least one of said transportable vessels, and for heating or cooling said transportable vessels;

temperature control means, operably connected to said jacket means, for controlling said temperature of said jacket means used for heating or cooling said transportable vessels and for effecting at least said type of process in which at least one of: (a) chemical reactions of said materials contained in said transportable vessels are controlled and (b) physical changes of said materials are caused;

means for transporting said transportable vessels in horizontal directions in the same floor stage among said floor stages, and in vertical directions between said plurality of floor stages based on at least said type of process, said jacket means being separable from said at least one of said transportable vessels received therein, wherein said jacket means comprises a plurality of members, and wherein said jacket means is attachable to and detachable from said at least one of said transportable vessels by closing and opening, respectively, said plurality of members capable of providing said type of process said materials in said transportable vessel must undergo by heating or cooling said transportable vessel; and closing and opening means for respectively attaching said jacket means to and detaching said jacket means from said at least one of said transportable vessels, wherein said closing and opening means includes rollers operably coupled to upper portions of said jacket means and rails mounted lower than said floor stage along which said rollers travel, and wherein said closing and opening means further includes a plurality of wires and pulleys which are driven by at least a pulley operably coupled to said upper portions of said jacket means.

2. The batch plant according to claim 1, further comprising at least one stacker crane means for transporting said plurality of vessels in said horizontal directions in the same floor stage among said floor stages, and in vertical directions between said plurality of floor stages.

3. The batch plant according to claim 1, further comprising conveying truck means for transporting said vessels in said horizontal directions in the same floor stage.

4. The batch plant according to claim 1, wherein each of said jacket means includes inner surfaces which contact outer surfaces of said at least one transportable vessel when said vessel is received within said jacket means, said inner surfaces being lined with a heat-conductive material for cushioning a load applied by said vessel onto said jacket means.

* * * * *